(12) United States Patent
Laletin et al.

(10) Patent No.: US 8,976,548 B2
(45) Date of Patent: Mar. 10, 2015

(54) METHOD AND APPARATUS FOR AC-TO-DC POWER CONVERSION

(71) Applicant: Sensus USA Inc., Raleigh, NC (US)

(72) Inventors: William H. Laletin, Slidell, LA (US); Robert Rouquette, Covington, LA (US); H. Britton Sanderford, Jr., New Orleans, LA (US)

(73) Assignee: Sensus USA, Inc., Raleigh, NC (US)

( * ) Notice: Subject to any disclaimer, the term of this patent is extended or adjusted under 35 U.S.C. 154(b) by 13 days.

(21) Appl. No.: 13/971,910

(22) Filed: Aug. 21, 2013

(65) Prior Publication Data

US 2014/0056039 A1 Feb. 27, 2014

Related U.S. Application Data

(60) Provisional application No. 61/692,049, filed on Aug. 22, 2012.

(51) Int. Cl.
| | | |
|---|---|---|
| *H02M 1/12* | (2006.01) | |
| *H02M 7/00* | (2006.01) | |
| *H02M 7/06* | (2006.01) | |
| *H02M 1/08* | (2006.01) | |
| *H02M 1/44* | (2007.01) | |

(52) U.S. Cl.
CPC .............. *H02M 7/062* (2013.01); *H02M 1/083* (2013.01); *H02M 1/44* (2013.01); *H02M 7/06* (2013.01)
USPC ............................................. 363/45; 363/125

(58) Field of Classification Search
USPC ...................... 363/44–48, 123–127
See application file for complete search history.

(56) References Cited

U.S. PATENT DOCUMENTS

| | | | | |
|---|---|---|---|---|
| 5,995,385 | A * | 11/1999 | Shimamura | 363/21.16 |
| 6,391,667 | B1 * | 5/2002 | Hashimoto | 438/17 |
| 6,529,390 | B2 * | 3/2003 | Takahashi | 363/21.14 |
| 7,245,511 | B2 * | 7/2007 | Lancaster et al. | 363/53 |
| 8,115,457 | B2 * | 2/2012 | Balakrishnan et al. | 320/166 |
| 8,624,562 | B2 * | 1/2014 | Balakrishnan et al. | 320/166 |
| 2009/0021969 | A1 | 1/2009 | Butler et al. | |
| 2014/0119084 | A1 * | 5/2014 | Ashikaga | 363/126 |

FOREIGN PATENT DOCUMENTS

| | | |
|---|---|---|
| EP | 0324904 A1 | 7/1989 |
| EP | 2595298 A1 | 5/2013 |
| WO | 2008155719 A1 | 12/2008 |
| WO | WO2014031717 A1 * | 2/2014 ............ H02M 7/06 |

* cited by examiner

*Primary Examiner* — Adolf Berhane
(74) *Attorney, Agent, or Firm* — Murphy Bilak & Homiller, PLLC

(57) ABSTRACT

In one aspect, the present invention reduces electromagnetic interference (EMI) caused by a capacitive dropper power supply by synchronizing the openings and closings of a shunt switched used for regulation control of the DC output voltage generated by the power supply, to zero crossings of AC current from the current-limiting resistor disposed in series at the AC input of the power supply. In one or more other embodiments, the capacitive dropper power supply includes disconnect circuitry that senses a loss of the input AC voltage source and in response wholly or partly disconnects internal regulation control circuitry from the supply's output filter capacitor to reduce the current drawn from the filter capacitor, thereby reducing the decay rate of the DC output voltage from the filter capacitor. The contemplated power supply may also be implemented in a Bipolar, BiCMOS or CMOS process, for realization in a compact integrated circuit device.

20 Claims, 3 Drawing Sheets

METHOD AND APPARATUS FOR AC-TO-DC POWER CONVERSION

RELATED APPLICATIONS

This application claims priority from the U.S. provisional patent application filed on 22 Aug. 2012 and assigned Application No. 61/692,049, which is incorporated herein by reference.

TECHNICAL FIELD

The present invention generally relates to AC/DC power conversion and particularly relates to "capacitive dropper" AC/DC power supplies that employ switched shunt feedback to provide output regulation.

BACKGROUND

Capacitively coupled power supplies, often referred to as "capacitive dropper" or "cap dropper" power supplies, employ a capacitive element, operative as a current limiting element, placed in series with the incoming AC voltage where its effective impedance at the AC input's frequency serves to reduce, by virtue of the current flowing through that impedance, the voltage presented to an immediately following rectifier element. The resultant rectified DC current may be filtered by a filter capacitor, and a variety of feedback and control means have been employed to realize a regulated DC voltage at said filter capacitor.

In a basic cap dropper power supply design, the AC current from the current-limiting capacitor is rectified and conveyed to one terminal of a filter capacitor having its other terminal connected to a suitable common potential, such as GND, allowing a voltage to be developed on the filter capacitor. Voltage regulation is achieved by providing a passive shunt means, such as a Zener diode or an integrated shunt regulator, connected to limit the maximum voltage that can develop.

The basic design provides for a moderate degree of regulation to be achieved for a range of external loads. However, any of the incoming power that is not used by the external load must be dissipated directly in the shunt sub-circuit.

To achieve higher operational efficiency, a saturated switch element replaces the passive shunt means. Conventional feedback control drives actuation of this shunt switch element, actuating it whenever the voltage on the filter capacitor reaches or exceeds its set point. When the shunt switch element is ON, the voltage across it will be very near zero such that current flow into it from the output capacitor will be prevented by a blocking rectifier element.

One variant of the above method uses high-frequency switching to control the frequency of the ON/OFF events of the shunt switch element; this variant also incorporates a series diode or other switching element disposed between the output capacitor and the shunt switch, to avoid discharging the capacitor when the shunt switch is closed. The use of high frequency switching control in such implementations reduces the voltage ripple magnitude present at the filter capacitor. Further, the high-frequency nature of the ripple allows a relatively smaller capacitor value to achieve adequate filtering, but the higher switching frequencies also lead to higher EMI.

SUMMARY

In one aspect, the present invention reduces electromagnetic interference (EMI) caused by a switch-mode capacitive dropper power supply by synchronizing the openings and closings of a shunt switch, used for regulation control of the DC output voltage generated by the power supply, to zero crossings of AC current flowing through the current-limiting capacitive element disposed in series at the AC input of the power supply. This control arrangement provides dual mechanisms for lowering EMI. First, the arrangement limits the switching frequency of the power supply to a maximum of twice the line frequency of the AC mains used to power it, so that switching events occurs far less often as compared to high-frequency switching designs. Second, by synchronizing actuation of the shunt switch with the current zero-crossings, this arrangement substantially eliminates both the abrupt current and voltage transients that would otherwise arise from non-synchronized operation of the shunt switch.

In another aspect, the present invention decreases sensitivity to interruptions in AC mains power. More particularly, at least some embodiments of the capacitive dropper power supply contemplated herein provide more robust operation in instances of temporary failure of the AC mains power, by providing disconnect circuitry. In response to detecting mains failure, the disconnect circuitry disconnects all or some of the internal regulation control circuitry of the power supply from the output filter capacitor that serves both to reduce voltage ripple and to store energy proportional to the square of the output DC voltage across it.

Disconnecting internal circuitry in this manner eliminates or at least greatly reduces the amount of current drawn from the output filter capacitor by the power supply, thus reducing the decay rate of the output DC voltage and the stored energy. The advantage of such reduction is particularly pronounced in applications where the load current demand at the regulated DC output is small (e.g., at or below the milliamps range), and in applications wherein it is important to reduce unnecessary current drain from the filter capacitor to preserve its voltage, and consequently its available energy, for as long as possible.

In yet another aspect, the present invention reduces the required circuit space, or otherwise simplifies circuit implementation and integration, by providing a Bipolar, BiCMOS or CMOS integrated circuit embodiment that includes some or all of the input, output, and regulation control circuitry of the contemplated capacitive dropper power supply.

With the above in mind, one embodiment of a capacitive dropper power supply (hereafter "power supply") is configured to operate as an AC-to-DC power converter and includes an input circuit configured for connection to an AC voltage source (mains power). The input circuit includes a bridge rectifier that is coupled in series to the AC voltage source through a current-limiting capacitor and provides a current signal at a bridge output that is derived from the AC voltage source. The contemplated power supply further includes an output circuit, which includes an output filter capacitor that is coupled to the bridge output through a reverse blocking element.

Still further, the power supply includes a shunt switch coupled across the bridge output so that the current signal flows into the output circuit when the shunt switch is open, and is shunted back to the AC voltage source when the shunt switch is closed. The DC voltage signal output from the power supply is developed at a supply output of the output circuit by the current signal being permitted to flow through the reverse blocking element and into the output circuit, thereby charging the output filter capacitor.

In this regard, a regulation control circuit within the power supply regulates the DC voltage signal by opening and closing the shunt switch responsive to sensing the DC voltage signal relative to a target voltage. To avoid creating a significant amount of EMI, the regulation control circuit synchronizes the openings and closings of the shunt switch to detected zero crossings of AC current from the current-limiting capacitor.

In some embodiments, the power supply also includes disconnect circuitry that is configured to disconnect at least a portion of the regulation control circuit from the DC voltage signal, in response to detecting a failure of the AC supply voltage. Such disconnection lowers or eliminates current drawn from the output filter capacitor by the regulation and control circuitry, and thus improves the hold-up time of the output DC voltage signal.

In another embodiment, the present invention comprises a method of operating a capacitive dropper power supply to reduce electromagnetic interference (EMI) caused by the capacitive dropper power supply. The method includes detecting zero crossings of an AC current from a current-limiting capacitor disposed in series at an AC supply input of the capacitive dropper power supply and synchronizing the openings and closings of a shunt switch, used to regulate a DC voltage generated by the capacitive dropper power supply, to the detected zero crossings of the AC current.

It is advantageously recognized herein that those zero crossings coincide with substantially zero voltage across the shunt switch in its open state and with substantially zero current through the switch in its closed state. Thus, the shunt switch is actuated closed only at times where there is a substantially zero voltage across it and actuated open only at times where there is a substantially zero current flowing through it. Here, "substantially zero" will be understood as meaning at or about zero, and hereafter the term "zero" is used to mean the same thing.

Further, it may be noted that when the switch is open, any residual capacitance in the net connected between the input rectifier and the reverse blocking rectifier will tend to hold the voltage at that net above the ground reference. To mitigate this effect, in one or more embodiments, a moderate valued resistor is placed in parallel with the shunt switch to gradually discharge this voltage as the current flowing through the current-limiting capacitor falls toward zero at the zero crossing. Such a configuration provides another advantage, inasmuch as the gradual discharge further reduces EMI by eliminating the residual voltage present across the shunt switch due to the charge storage effects of the parasitic capacitances.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
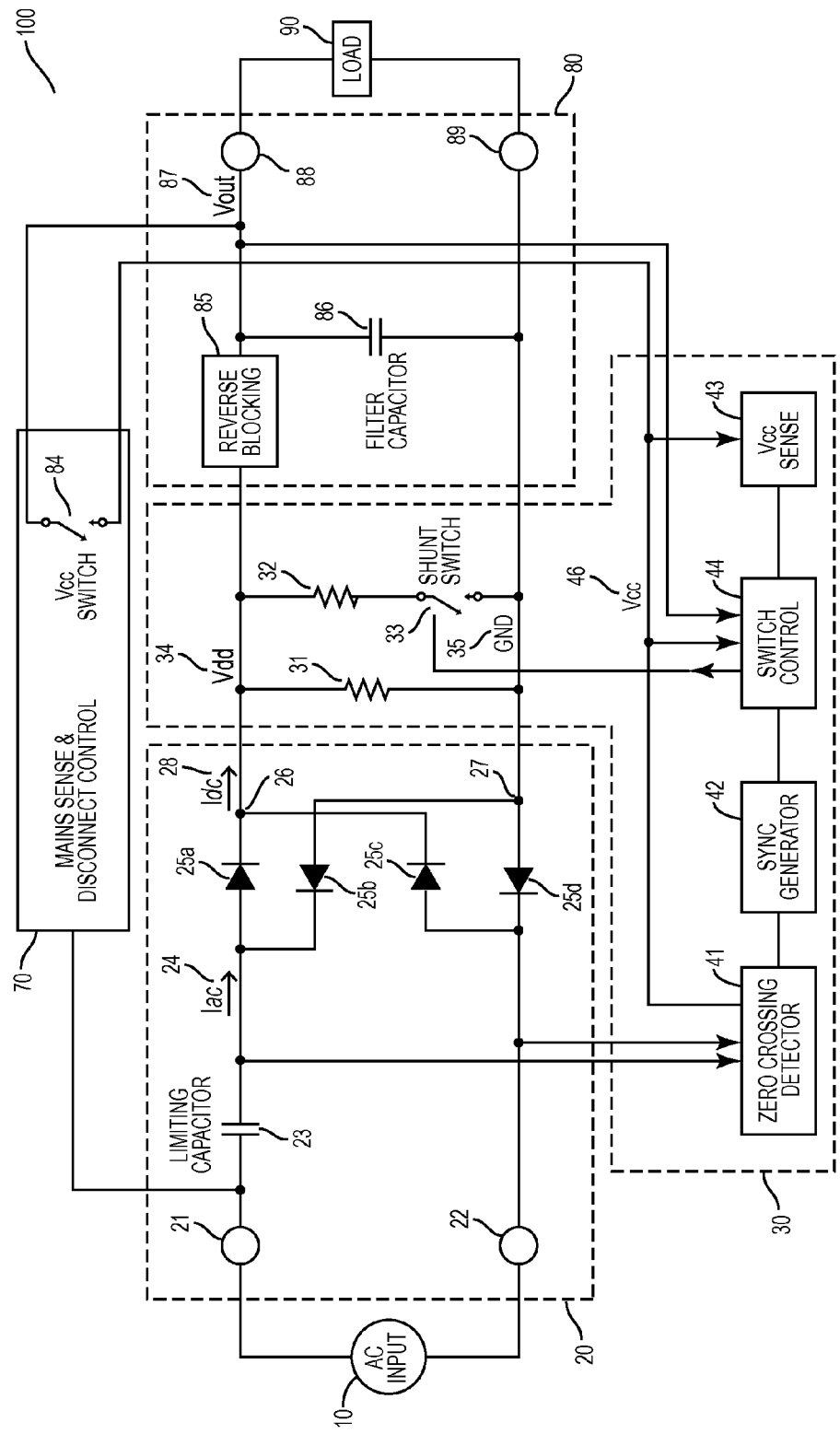
FIG. 1 is a block diagram of one embodiment of a capacitive dropper power supply.

FIG. 1 illustrates one embodiment of a cap dropper power supply 100 ("power supply 100") configured to operate as an AC-to-DC power converter. The power supply 100 includes an input circuit 20 configured for connection to an AC voltage source 10. The input circuit 20 includes a bridge rectifier (here formed from diodes 25a, 25b, 26c, 25d) that is coupled in series to the AC voltage source 10 through a current-limiting capacitor 23. According to this arrangement, the input circuit 20 provides a rectified DC current signal 28 flowing out of the positive bridge output 26, which current is derived from the AC voltage source 10.

The power supply 100 further includes an output circuit 80 that includes an output filter capacitor 86 coupled to the bridge output 26 through a reverse blocking element 85, which may be a diode, switch, or other element that prevents the output filter capacitor 86 from being discharged back into the preceding circuitry when a shunt switch 33 is closed. The shunt switch 33 is coupled between bridge output 26 and system GND 35—i.e., it shunts the bridge output 26 when closed. According to this arrangement, DC current signal 28, the full-wave rectified version of AC current signal 24, flows into output circuit 80 when the shunt switch 33 is open and is shunted back to the AC voltage source 10 when shunt switch 33 is closed.

As will be understood, a DC voltage signal 87 is developed at a supply output 88 of the output circuit 80 by the DC current signal 28 being permitted to flow through rectifier 85 into the output circuit 80 and thereby charge the output filter capacitor 86. The DC voltage signal 87, also referred to as the output DC voltage $V_{OUT}$, is regulated by a regulation control circuit 30.

In particular, the regulation control circuit 30 is configured to regulate the DC output voltage of the power supply 100 (the voltage of the DC voltage signal $V_{OUT}$) by opening and closing the shunt switch 33 responsive to sensing the DC voltage signal $V_{OUT}$ relative to a target voltage. Further, the regulation control circuit 30 is configured to synchronize the openings and closings of the shunt switch 33 to detected zero crossings of AC current 24 from the current-limiting capacitor 23. Such operation greatly reduces EMI caused by the power supply 100, because it prevents opening the shunt switch 33 at times when significant current is flowing through it, and it prevents closing the shunt switch 33 at times when there is significant voltage, Vdd 34, across it.

In other words, one aspect of the present invention is the advantageous recognition that actuation of the shunt switch 33 should be slaved to detected zero crossings of the AC current 24 to avoid or greatly reduce current transients associated with actuation of the shunt switch 33. As will be appreciated, the zero crossings of the AC current 24 flowing through limiting capacitor 23 can be detected directly, such as by differential sensing across a current-sense resistor interposed between the limiting capacitor and the input terminal of the bridge rectifier corresponding to the junction of diodes 25a and 25b, or equivalently placing such a current sense resistor in series with GND 35 net as it connects to bridge rectifier's negative terminal 27, or such a current sense resistor in series with the Vdd 34 net as it issues from the bridge rectifier's positive output terminal 26 or by sensing either or both of the AC voltages developed at the bridge rectifier's inputs, corresponding to the junctions of diodes 25a and 25b, and diodes 25c and 25d, respectively. Other current-sensing topologies are also within the scope of this invention, such as wherein both or either of the AC current 24 and the unfiltered DC current 28 may be sensed. Further, sensing of a related voltage or current signal that varies as a function of the AC current 24 is contemplated herein.

Thus, a zero crossing detector 41, as shown in the regulation control circuit 30, may be configured for direct or indirect sensing of the zero crossings of AC current 24 and/or DC current 28. The regulation control circuit 30 also may include a voltage sense circuit 43 to sense the DC voltage signal Vcc 46 that corresponds directly to $V_{OUT}$ 87 whenever Vcc switch 84 is closed, and a switch control circuit 44 to control actuation of the shunt switch 33.

Regardless of the specific circuit architecture adopted for the regulation control circuit 30, in an example configuration, the regulation control circuit 30 is configured to open the shunt switch 33 responsive to detecting a zero crossing of the AC current 24 occurring after it senses that the DC voltage signal $V_{OUT}$ 87 is below a target voltage set point, and is further configured to close the shunt switch 33 responsive to detecting a zero crossing of the AC current 24 occurring after it senses that the DC voltage signal $V_{OUT}$ 87 is above the same or another target voltage set point. Specifically, sense circuit 43, e.g., a comparator-based circuit, detects voltage Vcc 46 which is functionally equivalent to $V_{OUT}$ 87 whenever supply disconnect switch 84 is closed, may be used to sense the high/low voltage cases. The set point(s) may simply be determined by Vref 45 (shown in FIG. 4), as provided by a bandgap reference or other constant voltage circuit element. Such voltage-mode feedback sensing to achieve output voltage control will be immediately understood by one of ordinary skill in the arts. Further, note that in alternate embodiments the voltage comparison function incorporates hysteresis.

Figure 4:
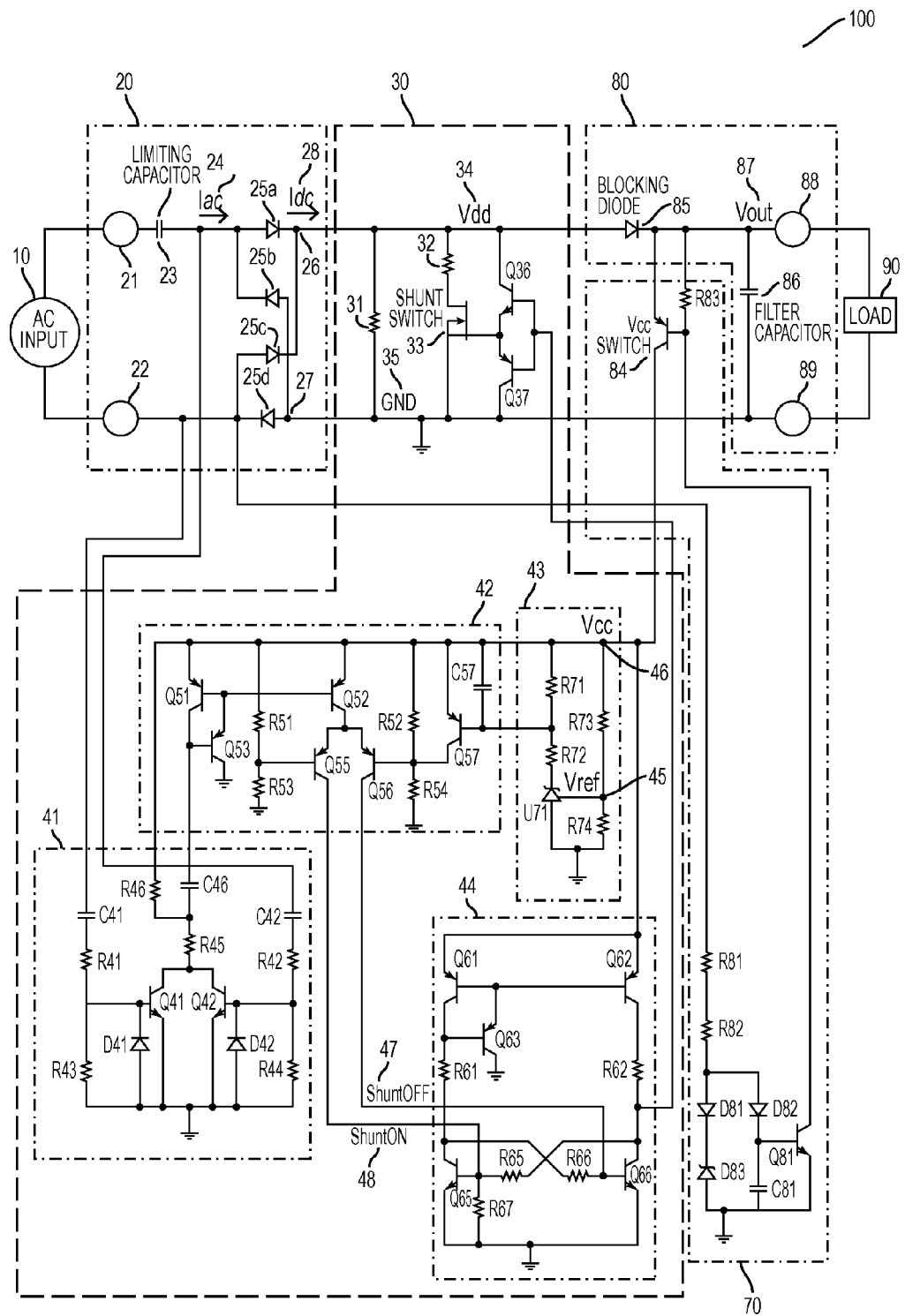
FIG. 4 is a schematic diagram illustrating example circuitry corresponding to the block diagram of FIG. 1.

The above control arrangement can be understood as the regulation control circuit 30 being configured to generate a switching signal responsive to detecting the zero crossings of the AC current 24, for switching the shunt switch 33 between its opened and closed states, and further being configured to assert, in response to sensing Vcc 46, corresponding to $V_{OUT}$ 87, that the DC output voltage $V_{OUT}$ 87 is above or below a target voltage set point, an enabling signal that enables the switching signal to actuate the shunt switch 33 upon receipt of the appropriate zero-crossing synchronized signal, ShuntON 48 or ShuntOFF 48 as shown in FIG. 4, respectively. Such operation can be understood as "gating" control of the shunt switch 33 so that it can be switched closed upon a next zero crossing of the AC current 24 after the DC voltage signal $V_{OUT}$ 87 has been detected as being high. Similar logic applies to the converse case, where the DC voltage signal $V_{OUT}$ 87 has been detected as being low.

As a consequence of slaving the openings and closings of the shunt switch 33 to the detected zero crossings of the AC current 24 from the current-limiting capacitor 23, the power supply 100 operates at a maximum switching frequency that is twice the line frequency of the AC voltage source 10. This relatively low switching frequency, e.g., 120 Hz for a 60 Hz mains supply, advantageously eliminates EMI that would be caused by high frequency switching, e.g., KHz switching, of the shunt switch 33, wherein switching events may often occur when either the current through or the voltage across shunt switch 33 is not zero.

As another advantage, as detailed in FIG. 4, some embodiments of the power supply 100 include disconnect circuitry 70 comprising a mains sensing sub-circuit of elements D81, D83, R81, and R82, a disconnect control sub-circuit of elements C81, D82, Q81, and R83, and a disconnect sub-circuit element 84 which may be a solid-state switch. Of course, these details only serve as an example. More generally, the disconnect circuitry 70 will be understood as any circuit arrangement that is configured to disconnect at least a portion of the regulation control circuit 30 from the DC voltage signal $V_{OUT}$ 87, in response to detecting a failure of the AC supply voltage provided to input terminals 21 and 22. Doing so lowers or eliminates current drawn from the output filter capacitor 86 by the regulation control circuit 30. That reduces the decay rate of the DC voltage signal $V_{OUT}$ 87 or, in other words, improves the hold-up time of the DC voltage signal $V_{OUT}$ 87. This feature is of importance if some or all of the load connected to terminals 88 and 89 must be provided with a small amount of sustaining current, supplied by capacitor 86, for a protracted time period following the interruption of mains power.

In the same or other embodiments, the reverse blocking element 85 comprises a reverse-blocking switch that is switched in mutually exclusive fashion with respect to the shunt switch 33. That is, the reverse blocking switch—which may be a solid state switch that preferably exhibits very low reverse leakage current when in its "off" state—will be closed ("on") when the shunt switch 33 is open ("off") and will be open ("off") when the shunt switch 33 is closed ("on").

Further, some embodiments of the power supply 100 include a shunt resistor 31 coupled across the output terminals 26 and 27 of the bridge rectifier. That is, a resistive element is connected at one end to the positive bridge output 26 and at the other end to the negative bridge output 27, corresponding to GND 35, which will be understood as being the same node to which the anodes of bridge rectifier diodes 25b and 25d are connected. This shunt placement of a resistive load element forces the voltage across it, corresponding to voltage Vdd 34, to substantially track the current flowing through the rectifier bridge, which further reduces EMI, because this voltage is always lowest at each zero-crossing of the incoming current from the AC voltage source 10.

In some embodiments, a current-limiting resistor 32 is placed in series with shunt switch 33, to prevent excessive current from flowing through the shunt switch when in its "on" state, in the event that a high voltage, fast rise-time transient surge pulse appears across the input terminals 21 and 22 and causes a significant current surge to propagate through limiting capacitor 23.

Figures 2, 3:
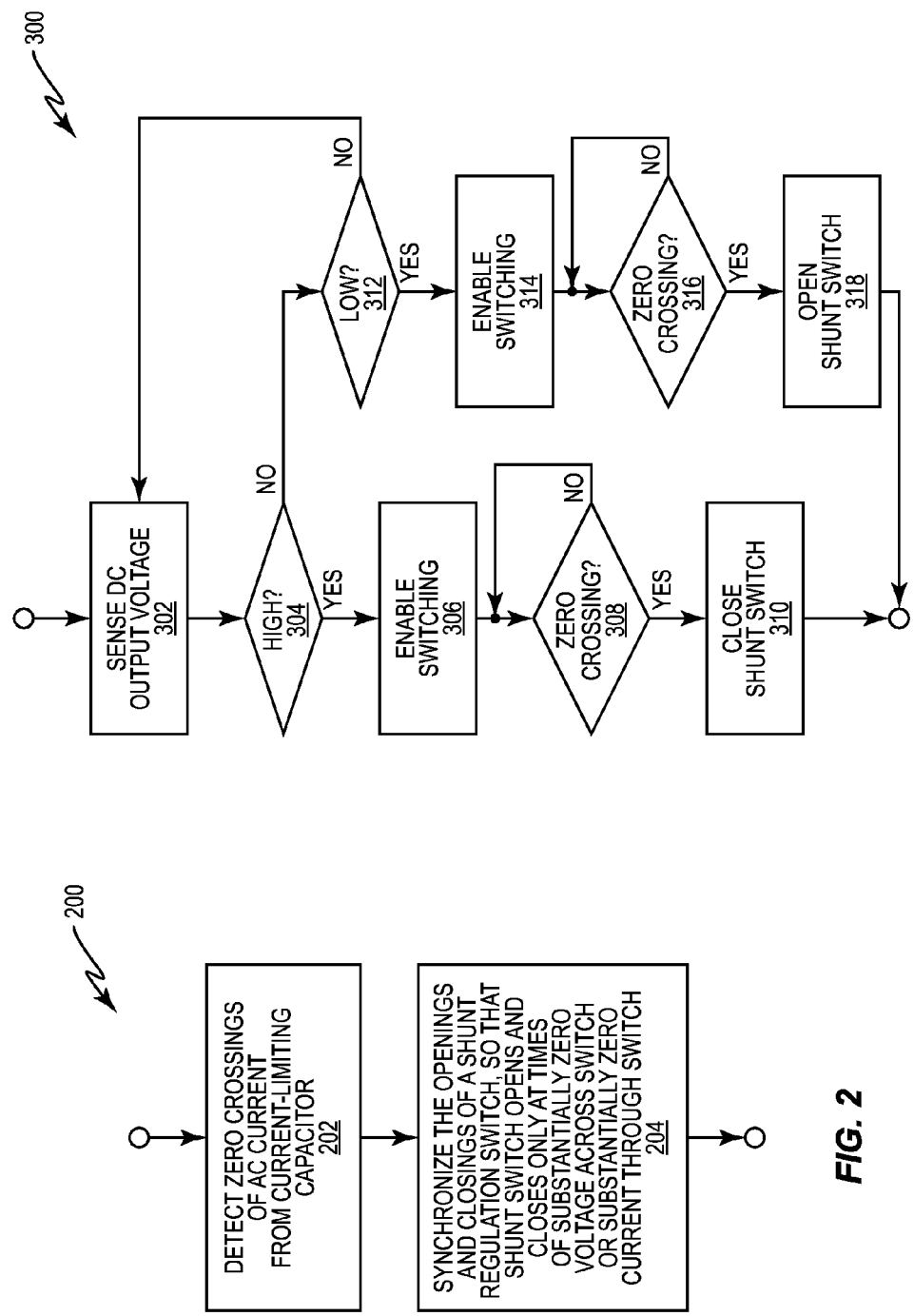
FIG. 2 is a logic flow diagram of one embodiment of a method of operating a capacitive dropper power supply.
FIG. 3 is a logic flow diagram of further example details for the method introduced in FIG. 2.

As will be appreciated from the above circuit arrangement examples, it is contemplated herein to operate a cap dropper power supply in a manner that employs innovative techniques for reducing EMI in a cap dropper power supply architecture. The flow diagram of FIG. 2 depicts an example method 200 of operating a capacitive dropper power supply to reduce electromagnetic interference (EMI) caused by the capacitive dropper power supply. The power supply 100 will be understood as being an example arrangement for practicing the method 200.

According to its details, the method 200 includes detecting (Block 202) zero crossings of the AC current 24 from the current-limiting capacitor 23, which is disposed in series at an AC supply input 10 (see FIG. 1) of the power supply 100. The method 200 further includes synchronizing (Block 204) the openings and closings of the shunt switch 33 used to regulate the DC voltage 87 generated by the power supply 100 to the detected zero crossings of the AC current 24, so that the shunt switch 33 is closed only at times where there is a substantially zero voltage across it and opened only at times where there is a substantially zero current flowing through it.

FIG. 3 illustrates another example method 300, which can be understood as a more detailed illustration of the method 200. The method 300 may be looped, repeated, or otherwise performed on an ongoing basis, based on continuous or discrete monitoring of the DC voltage signal 87 against the target voltage.

The method 300 thus includes sensing (Block 302) the output DC voltage of the power supply 100. If the DC voltage signals $V_{OUT}$ 87 is high (above a set point, YES from 304), switching of the shunt switch 33 is enabled (Block 306). At a next zero crossing of the AC current 24 (YES from 308), the shunt switch 33 is closed (Block 310). That closure prevents the DC current signal 28 from the rectifier bridge output 26 from charging the output filter capacitor 86, by shunting the current signal 28 back to the AC voltage supply 10.

Conversely, if the DC voltage signal $V_{OUT}$ 87 is sensed as being low (below the set point), processing progresses from Block 312 (YES from 312) and switching is enabled (Block 314). At the next detected zero crossing of the AC current 24 (YES from 316), the shunt switch 33 is opened (318). That opening allows the DC current signal 28 to flow through the reverse blocking element 85, which causes the output filter capacitor 86 to charge.

As, for example, details for the regulation control circuit 30 that accomplishes the above synchronization process, the involved sensing and control circuitry may include an output voltage sensing circuit 43 and a sync pulse generator circuit 42 and set-reset (SR) flip-flop circuit 44 operative as a switch control, as shown in FIG. 4, responsive to output voltage 87 and zero-crossings detected by detector 41. The zero-crossing detector 41 generates brief, current-mode sync pulses at zero-crossing events of the AC current 24. Correspondingly, the dual output current mirror 42 operates as a current-steering switch responsive to the output voltage at the output filter capacitor 86, as sensed by the output sense circuit 43, and it directs the synchronous current pulses, ShuntOFF 47 and ShuntON 48, to the inputs of the RS flip-flop 44. The flip-flop 44 controls the shunt switch 33. If a reverse blocking element 85 is used, e.g., a reverse blocking switch, the flip-flop 44 may control that switch in mutually exclusive fashion with respect to the shunt switch 33. The shunt switch 33 shunts current to GND 35 (when the DC voltage signal $V_{OUT}$ 87 is above the set point) or passes current to the output filter capacitor 86 (when the DC voltage signal is too low).

FIG. 4 provides a schematic illustration of such an implementation, in the context of an overall example implementation of the power supply 100.

Of course, other circuit arrangements can be used to synchronize actuation of the shunt switch 33 to zero crossings of the AC current 24 from the current-limiting capacitor 23. In general, modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of this disclosure. Although specific terms may be employed herein, they are used in a generic and descriptive sense only and not for purposes of limitation.

What is claimed is:

1. A capacitive dropper power supply configured to operate as an AC-to-DC power converter and comprising:
    an input circuit configured for connection to an AC voltage source, said input circuit including a bridge rectifier that is coupled in series to the AC voltage source through a current-limiting capacitor and provides a current signal at a bridge output that is derived from the AC voltage source;
    an output circuit that includes an output filter capacitor that is coupled to the bridge output through a reverse blocking element;
    a shunt switch coupled across the bridge output so that the current signal flows into the output circuit when the shunt switch is open and is shunted back to the AC voltage source when the shunt switch is closed, wherein a DC voltage signal is developed at a supply output of the output circuit by the current signal being permitted to flow into the output circuit and thereby charge the output filter capacitor;
    a regulation control circuit configured to regulate the DC voltage signal by opening and closing the shunt switch responsive to sensing the DC output voltage of the capacitive dropper power supply relative to a target voltage and further configured to synchronize the openings and closings of the shunt switch to detected zero crossings of AC current from the current-limiting capacitor.

2. The capacitive dropper power supply of claim 1, wherein the regulation control circuit includes a zero-crossing detection circuit configured to detect the zero crossings of the AC current either directly, by sensing the AC current, or indirectly, by sensing either a related current-mode signal or a related voltage-mode signal that varies as a function of the AC current.

3. The capacitive dropper power supply of claim 1, wherein the regulation control circuit is configured to open the shunt switch responsive to detecting a zero crossing of the AC current occurring after sensing that the DC voltage signal is below a target voltage set point, and is further configured to close the shunt switch responsive to detecting a zero crossing of the AC occurring after sensing that the DC output voltage is above the same or another target voltage set point.

4. The capacitive dropper power supply of claim 1, wherein the regulation control circuit is configured to generate a switching signal responsive to detecting the zero crossings of the AC current, for switching the shunt switch between its opened and closed states, and is further configured to assert, in response to sensing that the DC output voltage is above or below a target voltage set point, an enabling signal that enables the switching signal to actuate the shunt switch.

5. The capacitive dropper power supply of claim 1, wherein, as a consequence of synchronizing the openings and closings of the shunt switch to the detected zero crossings of the AC current from the current-limiting capacitor, the capacitive dropper power supply operates at a maximum switching frequency that is twice a line frequency of the AC voltage source.

6. The capacitive dropper power supply of claim 1, wherein the capacitive dropper power supply further includes disconnect circuitry configured to disconnect at least a portion of the regulation control circuit from the DC voltage signal, in response to detecting a failure of the AC supply voltage, to thereby lower or eliminate current drawn from the output filter capacitor by the regulation control circuit.

7. The capacitive dropper power supply of claim 1, wherein the reverse blocking element comprises a reverse-blocking switch that is switched in mutually exclusive fashion with respect to the shunt switch.

8. The capacitive dropper power supply of claim 1, further comprising a shunt resistor coupled across the output of the bridge rectifier.

9. The capacitive dropper power supply of claim 1, further comprising a current limiting resistor in series with the shunt switch.

10. The capacitive dropper power supply of claim 1, further comprising a current steering circuit controlled jointly by zero-crossings and the DC output voltage level, and configured to emit corresponding current pulses to a flip-flop that opens and closes the shunt switch.

11. A method of operating a capacitive dropper power supply to reduce electromagnetic interference (EMI) caused by the capacitive dropper power supply, said method comprising:
    detecting zero crossings of an AC current from a current-limiting capacitor disposed in series at an AC supply input of the capacitive dropper power supply; and synchronizing the openings and closings of a shunt switch used to regulate a DC output voltage generated by the capacitive dropper power supply, to the detected zero crossings of the AC current, so that the shunt switch is closed only at times where there is a substantially zero voltage across it and opened only at times where there is a substantially zero current flowing through it.

12. The method of claim 11, wherein detecting the zero crossings of the AC current from the current-limiting capacitor disposed in series at the AC supply input of the capacitive dropper power supply comprises directly sensing the AC current, or sensing a related current-mode signal or a related voltage-mode signal that varies as a function of the AC current.

13. The method of claim 11, wherein synchronizing the openings and closings of the shunt switch used to regulate the DC output voltage generated by the capacitive dropper power supply includes opening the shunt switch responsive to detecting a zero crossing of the AC current occurring after sensing that the DC voltage signal is below a target voltage set point, and closing the shunt switch responsive to detecting a zero crossing of the AC occurring after sensing that the DC output voltage is above the same or another target voltage set point.

14. The method of claim 11, wherein synchronizing the openings and closings of the shunt switch used to regulate the DC output voltage generated by the capacitive dropper power supply includes generating a switching signal responsive to detecting the zero crossings of the AC current, for switching the shunt switch between its opened and closed states, and asserting, in response to sensing that the DC output voltage is above or below a target voltage set point, an enabling signal that enables the switching signal to actuate the shunt switch.

15. The method of claim 11, further comprising, based on synchronizing the openings and closings of the shunt switch to the detected zero crossings of the AC current from the current-limiting capacitor, operating the capacitive dropper power supply at no more than a maximum switching frequency that is twice a line frequency of the AC voltage source.

16. The method of claim 11, further comprising disconnecting at least a portion of a regulation control circuit in the capacitive dropper power supply from the DC voltage signal, in response to detecting a failure of the AC supply voltage, to thereby lower or eliminate current drawn from an output filter capacitor of the capacitive dropper power supply by the regulation control circuit.

17. The method of claim 11, further comprising operating a reverse-blocking switch in mutually exclusive fashion with respect to the shunt switch, said reverse-blocking switch disposed in series with an output filter capacitor of the capacitive dropper power supply, wherein said output filter capacitor is permitted to charge when said shunt switch is open and said reverse-blocking switch is closed, and wherein opening said reverse-blocking switch prevents discharge of the output filter capacitor through the shunt switch when the shunt switch is closed.

18. The method of claim 11, further comprising providing a shunt resistor coupled across the output of the bridge rectifier.

19. The method of claim 11, further comprising providing a current limiting resistor in series with the shunt switch.

20. The method of claim 11, wherein synchronizing the openings and closings of the shunt switch used to regulate the DC output voltage generated by the capacitive dropper power supply includes opening and closing the shunt switch via an output signal from a flip-flop operating in response to current pulses corresponding to the zero crossings of the AC current, as emitted from a current steering circuit that is jointly controlled by the zero crossings and the DC output voltage level.

* * * * *